July 16, 1957 H. C. R. CARLSON 2,799,162
APPARATUS FOR TESTING TORSION SPRINGS
Filed Jan. 28, 1954
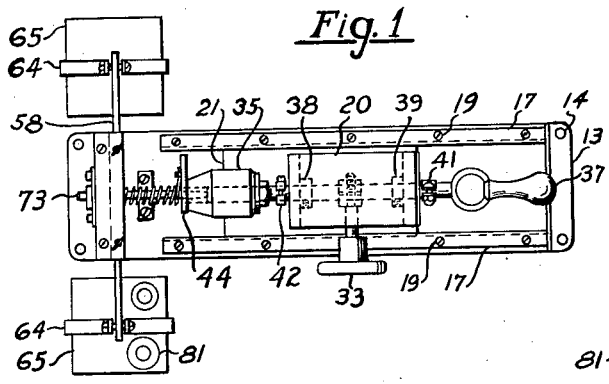
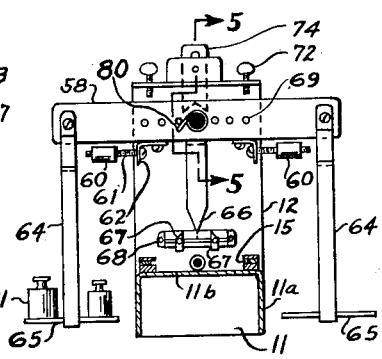
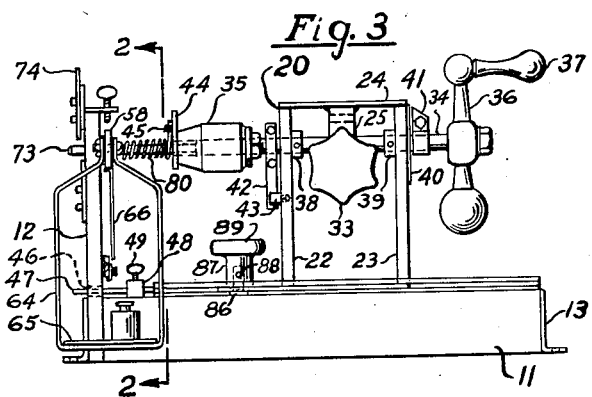
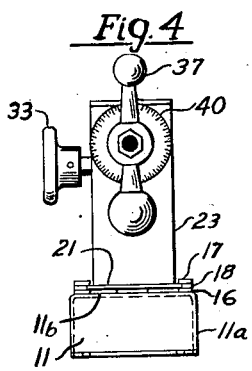
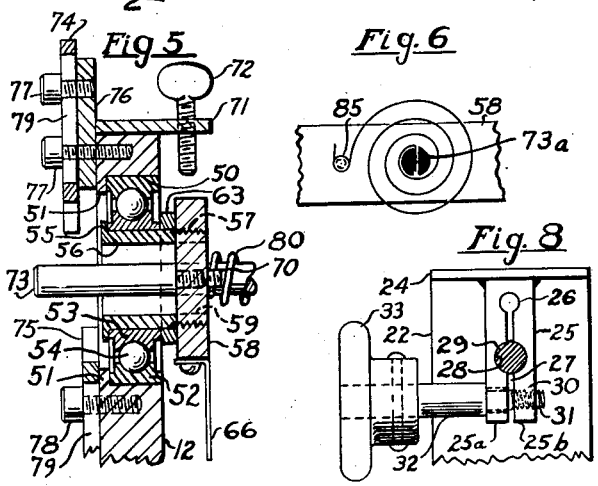
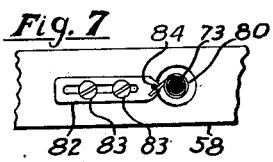
INVENTOR.
Harold C. R. Carlson
BY Bruce B. Clyman
Attorney

2,799,162

APPARATUS FOR TESTING TORSION SPRINGS

Harold C. R. Carlson, New York, N. Y.

Application January 28, 1954, Serial No. 406,778

11 Claims. (Cl. 73—161)

The present invention relates to apparatus for testing or checking the loads and deflections of torsion, double torsion, spiral, clock and power springs and the like.

Accordingly, it is an object of the present invention to provide spring testing apparatus which is particularly useful in the inspection departments of spring and product manufacturers, government arsenals and laboratories.

It is a further object of the present invention to provide spring testing apparatus for various type torsion springs which can be easily and quickly operated so that a great number of springs may be tested in a given period of time. For example, it is an object to provide a novel device that can be used to test between 300 and 600 springs per hour depending upon the type of spring tested.

It is another object of the present invention to provide torsion spring testing apparatus which is compact, rugged and of such size that it can be readily moved from work bench to work bench as desired.

Still another object of the present invention is to provide a spring tester which meets the requirements of the National Bureau of Standards for precision scales.

Other objects and advantages of the present invention will become more apparent as it is described in detail below with particular reference to the accompanying drawings wherein Figure 1 is a plan view of my novel spring testing device;

Figure 2 is a view taken on line 2—2 of Figure 3 and looking in the direction of the arrows;

Figure 3 is a side view in elevation of my spring testing device;

Figure 4 is an end view of my device looking at the right end of Figure 3;

Figure 5 is a sectional view taken on line 5—5 of Figure 2 and looking in the direction of the arrows;

Figure 6 is an enlarged, broken, elevational view of the beam arm of my spring testing device, particularly showing a spiral type spring being tested;

Figure 7 is a view similar to Figure 6 but showing adapter means on the beam arm for use with exceptionally small springs; and Figure 8 is an enlarged detailed view showing clamp means designed to lock the main shaft.

With particular reference to Figures 1, 2 and 3, there is shown a longitudinally extending base 11 having side walls 11a and top 11b. A vertical and rectangularly shaped bearing stand 12 is welded or otherwise permanently affixed to one end of the base 11. A pair of L-shaped brackets 13 are disposed at either end of the base 11, one bracket being adjacent the bearing stand 12 and the other being adjacent the other end of the base. These L-shaped brackets 13 have openings 14 in their flat foot portions whereby the base 11 may be mounted on a work bench or other suitable support.

Extending along either edge of the top 11b of the base 11 is a pair of parallel opposing guide channels 15, each of which consists of a lower guide plate 16, an upper guide plate 17, and a spacer bar 18 sandwiched between the guide plates 16 and 17. The inwardly facing edges of the guide plates 16 and 17 extend beyond those of adjacent sandwiched spacer bars 18 so as to define the channels 15. The guide plates 16 and 17 and spacer bars 18 are all fixed to the top 11b of the base plate 11 by means of screws or bolts 19. The guide channels 15 extend from a point near the bearing stand 12 to the opposite end of the base 11.

A carriage assembly 20 comprising a rectangular base plate 21 and the upright shaft supporting stands 22 and 23 is slidably positioned on the base 11. The side edges of base plate 21 are received within the guide channels 15 thereby permitting the base plate and, accordingly, the carriage assembly 20 to slide up and back along the base 11.

The shaft supporting stands 22 and 23, which are welded or otherwise affixed to the base plate 21, are rectangular in shape and lie transversely of the base plate. Shaft supporting stand 23 is affixed to the base plate 21 near that end farthest from bearing stand 12. A cover plate 24 is welded to and connects the tops of the shaft supporting stands 22 and 23. Welded to the bottom of the cover plate 24 at a point approximately equidistant between shaft supporting stands 22 and 23 is a clamp post 25, which extends partway down between the shaft supporting stands.

As best seen in Figure 8, a small hole 26 located near the top of clamp post 25 extends through the clamp post and in a direction parallel to the cover plate 24. A vertical slit 27 extends upwardly from the bottom of the clamp post 25 to the hole 26 thereby providing the clamp post with legs 25a and 25b. Opposing semi-circular grooves 28 are formed on the inner faces of the legs 25a and 25b so as to define the bore 29 extending through the clamp post 25 and longitudinally of the base 11. A threaded bore 30 is also provided in the clamp post 25 below the bore 29 and extending transversely thereof. This threaded bore 30 is adapted to receive the projecting threaded end 31 of horizontal hand knob shaft 32, which carries the hand knob 33. By rotating the hand knob 33 clockwise, the legs 25a and 25b will be brought together and, conversely, they will be sprung apart by counter-clockwise rotation of the hand knob. Thus, the legs 25a and 25b serve as locking means to prevent the rotation of any shaft that may be in the bore 29.

A T-shaped lock stud 86 is threaded down through the slidable base plate 21 at a point between shaft supporting stand 22 and bearing stand 12. The bottom of the lock stud 86 is adapted to bear against the top 11b of base 11. The upper end of the lock stud 86 is threadably received in the vertical hand knob shaft 87 and held thereto by set screw 88. A hand knob 89 is fixedly mounted on the shaft 87.

Rotation of the hand knob 89 will, of course, serve either to lock or unlock the carriage assembly 20 in place on the base 11.

A horizontal crankshaft 34 extends through both shaft supporting stands 22 and 23. A conventional type chuck 35 is threadably positioned on the end of the crankshaft 34 nearest the bearing stand 12 and a balanced crank 36 having the revolving handle 37 is fixedly mounted on the other end of the crankshaft. Collars 38 and 39 embrace the crankshaft 34 at points adjacent opposing faces of the shaft supporting stands 22 and 23. These collars 38 and 39, which are held in place on the crankshaft 34 by suitable set screws, serve to prevent the crankshaft from sliding in the shaft supporting stands 22 and 23.

A protractor 40, mounted on the outer face of shaft supporting stand 23, is adapted to cooperate with the pointer 41, which is rotataby mounted on the crankshaft 34. The pointer 41 frictionally embraces the crankshaft 34 so that it may turn with the crankshaft or be itself manually rotated independently of the crankshaft. The protractor 40 and pointer 41 are used to determine the degree of deflection of any given spring being tested.

A position stop piece 42 is carried by the crankshaft 34 between the chuck 35 and the shaft supporting stand 22. This stop piece 42 extends radially of the crankshaft 34 and is adapted to abut against pin 43 in shaft supporting stand 22 thereby serving to limit rotation of the crankshaft. The position stop piece 42 is further adapted to be slid along the crankshaft 34 so that it will not, unless desired, abut against pin 43.

A bored chuck bar 44 is carried on the end of chuck 35, the bore of the chuck bar being in alignment with the bore of the chuck 35. A pin 45 extends outwardly from the face of the chuck bar toward the bearing stand 12.

Returning now to a detailed description of the bearing stand 12 and its associated parts, it is seen that the bearing stand has a small bore 46 which is designed to receive the rod 47, which in turn is slidably received within block 48 fixedly mounted on top 11b of base 11. A set screw 49 extends down into block 48 and is adapted to engage and lock rod 47 in position. The rod 47 acts to fix the end position of carriage assembly 20. This is of great aid in speeding up the testing of springs of the same size because the operator does not have to continually adjust the carriage assembly 20 for each testing. This is of particular importance in production testing.

There is provided a bore 50 in the bearing stand 12 which is located at a level with the crank shaft 34. The bore 50 is of reduced diameter on the outer face of bearing stand 12 thereby forming the annular shoulder 51. An annular ball bearing unit 52 comprising the usual inner and outer races 53 and ball bearings 54 is press fitted within the bore 50 and seats in part against annular shoulder 51 and in part against the outwardly flanged end 55 of bushing 56, which is press fitted within the central bore of the ball bearing unit. The unflanged end 57 of the bushing is threaded and extends outwardly beyond the inner face of vertical bearing stand 12.

There is further provided a horizontal and balanced beam arm 58 which has a centrally located threaded bore 59. The beam arm 58 is mounted on the threaded end 57 of the bushing 56 and is able to oscillate about the longitudinal axis of the bushing. A pair of balancing weights 60 are threadably mounted on screws 61 in L-shaped brackets 62 attached to the bottom of the beam arm 58. A washer 63 is fitted around the extending end of bushing 56 between beam arm 58 and ball bearing unit 52.

A pair of weighing pan supports 64 are pivotally mounted at either end of the beam arm 58. These weighing pan supports 64 are adapted to carry the flat weighing pans 65.

A pointer arm 66 is connected to the bottom of the beam arm 58 at the center line thereof and extends downwardly so that its pointed end can be read in conjunction with the tolerance markers 67 adjustably positioned on the horizontal scale 68 located on the inner face of stand 12 above bore 46. When the beam arm 58 is in equilibrium and perfectly balanced, the pointed end of the pointer arm 66 will register with the center line of the horizontal scale 68.

A plurality of regularly spaced apart and horizontally aligned holes 69 are provided in the beam arm 58 on either side of the bore 50. A pin 70 is adapted to fit in any of the holes 69.

The fixed plate 71 extends across the top of bearing stand 12 and overhangs the beam arm 58. A pair of set screws 72 extend vertically through fixed plate 71 and serves as stop means to limit the degree of oscillation of beam arm 58.

The chuck 35 is adapted to embrace one end of a spring supporting means such as an arbor 73, which extends through the chuck bar 44 and through the bore 59 in the beam arm 58 and through bushing 56. The fact that the arbor 73 is able to extend through the bearing stand 12 is of special importance in that arbors of any size can be used with my novel apparatus. Heretofore, it was necessary to design special arbors for the various types of spring testing apparatus employed.

Sometimes, a very thin arbor is employed, in which case the arbor is subject to bending. In order to overcome this difficulty, I have provided a pair of overlapping arbor guides 74 and 75, which are located on the bearing stand 12, both above and below the bore 50. Both arbor guides 74 and 75 have opposing V-slotted ends. The upper arbor guide 74 is adjustably attached to fixed extension plate 76 on bearing stand 12 by means of set screws 77. The lower arbor guide 75 is adjustably attached to bearing stand 12 by set screws 78. Vertically extending slots 79 are provided in each arbor guide 74 and 75 to permit the guides to be moved vertically toward and away from the arbor 73. When a very thin arbor is employed, the arbor guides 74 and 75 are adjusted toward each other to a position embracing the end of the arbor so as to provide an end support therefor.

OPERATION

The testing of torsion springs for load and deflection requirements is somewhat similar to the testing of compression and extension springs except that the load is called torque and is expressed in inch-pounds or inch-ounces and the deflection is expressed in degrees instead of in inches. Thus, the load exerted by a torsion spring could, for example, be described as 10 inch-pounds torque at 90° deflection. Variations in the manner of specifying the torque are often used, such as 160 inch-ounces with arms 45° apart. It should further be remembered that the torque equals the load multiplied by the distance from the load to the central axis of the spring being tested. Thus, a 5 pound load at a distance of 4 inches from the central axis of the spring exerts 20 inch-pounds of torque. However, weights supplied with my apparatus are calculated to include the distance of the load from the central axis so that this multiplication is obviated.

When it is desired to employ my apparatus, the base 11 thereof is fastened down on a suitable desk or work bench away from any vibrating machinery.

*Determination of torque for given deflection.*—Adjust both set screws 72 to hold beam arm 58 in a horizontal position. Then, insert a close fitting arbor 73 into chuck 35 and place a spring 80 on the arbor 73. The arbor should be of such diameter that the spring 80 can just rotate freely therearound. Next, the carriage assembly 20 is adjusted so that one arm of the spring 80 lightly rests against the pin 70 on the beam arm 58 and so that the other arm of the spring rests slightly against pin 45 on chuck bar 44. Then set the pointer 41 to "0" on the protractor 40. Turn crankshaft 34 the number of rotations or degrees required and then lock it in position by tightening clamp post 25. Next, release set screws 72 so that the beam arm 58 may swing freely. Finally, place the weights 81 in a weighing pan 65 until beam arm 58 is horizontal as will be indicated by pointer arm 66. The torque in inch-pounds or inch-ounces is determined by simply adding the loads marked on the weights 81. As stated above, these weights already take into consideration the distance of the load from the central axis of the spring 80. For left hand wound springs, the weight should be placed in the left weighing pan 65. For right hand wound springs, the weight should be placed in the right weighing pan 65.

*Determination of deflection for a given torque.*— Proceed as above, except that first place weights 81 equal to the given torque in the pan 65 and then release the set screws 72 so that the beam arm 58 can move freely. Finally, rotate crankshaft 34 until the pointer arm 66 is vertical. Then read the angular deflection on the protractor dial 40.

*Determination of angular distance between the arms of the torsion spring in a free position.*—Adjust both set screws 72 until beam arm 58 is held horizontal. Insert a proper arbor 73 in chuck 35 and slide carriage assembly 20 as close as possible to beam arm 58. Rotate crankshaft 34 until chuck bar 44 is parallel to beam arm 58. Set pointer 41 to "0" with respect to the protractor 40. Then place a spring 80 on the arbor 73 and hold one spring arm so it is parallel with beam arm 58. Turn crankshaft 34 until the chuck bar 44 is parallel with the other arm of the spring 80. Then, read the angular distance that the pointer 41 has turned with relation to the protractor 40.

*Determination of torque when spring arms are deflected apart a given number of degrees.*—First, determine the angular distance between the spring arms in the free position as described above. Then, subtract the exact number of degrees they should be apart from the number of degrees in the free position and the result is the number of degrees rotation required. Next, set the pointer 41 to "0" with relation to the protractor 40 and turn the crankshaft 34 the number of degrees required. Lock the crankshaft 34 in position and place weights 81 in weighing pan 65 until the beam arm 58 is in balance. Add the loads marked on the weights 81.

*Determination of rate or torque per degree of travel.*—The rate or torque per degree of travel can be determined by deflecting a spring any convenient number of degrees and noting the first load and then deflecting the spring an additional number of degrees and noting the second load. The difference in the two loads divided by the added amount of travel is the rate or torque per degree.

For example, rotate a spring from the free position a few degrees and the torque might be 10 inch-pounds. Then rotate the spring an additional amount, e. g. 15°, and the torque might be 40 inch-pounds. The rate equals 40 minus 10 divided by 15 and equals 2 inch-pounds torque per degree.

*Production testing.*—To meet a specified load tolerance, add a weight 81 equal to the tolerance to the exact load already in the weighing pan 65, and then adjust the tolerance marker 67 to line up with the deflected position of the pointer arm 66. Then set the other tolerance marker 67 an equal distance away from the other side of the zero position. Next, remove the tolerance weight. The stop piece 42 adjacent the chuck 35 also can be adjusted so that a rotation to a definite position between spring arms can always be made. The rod 47 on the base 11 is for convenience in sliding the carriage assembly 20 to a definite position.

If it is desired to test a double torsion, spiral, clock, or power spring, a screw 85 longer in length than pin 70 is positioned in a hole 69 in the beam arm 58 and a slotted arbor 73a is employed in place of a regular arbor. For testing, the outer arm of the spring is fastened to the screw 85 and the inner end is inserted within the slot in the arbor 73a. This is best seen in Figure 6.

With reference to Figure 7, there is shown an adapter 82 for measuring the torque of extremely small springs. The adapter 82 is adjustably mounted on the face of beam arm 58 by means of screws 83 extending through a longitudinal slot in the adapter. A pin 84 is located on the end of the adapter for engagement with the spring arm of the small spring. A similar adapter (not shown) is applied to the end of the chuck bar 44 so that the opposite arm of the spring will engage the pin 84 on the adapter.

Oversized or special arbors made from wood, dowels, or metal can be turned down at one end to fit the chuck 34.

While my invention has been described in detail and shown with respect to the accompanying drawing, it is not to be limited to such details since many changes and modifications may be made in the invention without departing from the spirit and scope thereof. Hence, it is desired to cover any and all forms and modifications of the invention which may come within the language and scope of any one or more of the appended claims.

I claim:

1. Spring testing apparatus including a base, balance means located at one end of said base, a slidable carriage positioned on said base, spring supporting means, rotatable means mounted on said carriage and adapted to hold said spring supporting means, said spring supporting means adapted to extend from said rotatable means to said balance means, and means on both said balance means and said rotatable means adapted to engage the ends of any spring positioned on said spring supporting means, said spring supporting means comprising a spindle adapted to pass through the spring and also the said balance means on occasions, rotation of said rotatable means causing a force to be transmitted through said spring to said balance means when the ends of said spring are engaged by said means on both said balance means and said rotatable means.

2. Spring testing apparatus including a base, balance means located at one end of said base, a carriage slidable on said base, spring supporting means, rotatable chuck means positioned on said carriage and being adapted to hold said spring supporting means so that it extends to said balance means, means on both said balance means and said chuck means adapted to engage the ends of any spring carried by said spring supporting means, said spring supporting means comprising a spindle adapted to pass through the spring and also the said balance means on occasions, rotation of said chuck means causing a force to be transmitted through said spring to said balance means when the ends of said spring are engaged by said means on both said balance means and said chuck means, and means for indicating the number of degrees said chuck means is rotated, said balance means adapted to measure said transmitted force.

3. Spring testing apparatus including a base, balance means located at one end of said base and comprising an upright member and a balanced beam pivotally mounted on said upright member, a carriage slidable on said base, spring supporting means, rotatable chuck means positioned on said carriage and being adapted to hold said spring supporting means in such manner that said spring supporting means can extend to said beam, means on both said beam and said chuck means adapted to engage the ends of any spring carried by said spring supporting means, rotation of said chuck means causing a force to be transmitted through said spring to said beam when said spring ends are engaged by said means on both said beam and said chuck means, and means for indicating the number of degrees said chuck means is rotated, said balance means adapted to measure said transmitted force.

4. Spring testing apparatus including a base, balance means located at one end of said base and comprising an upright member and a balanced beam pivotally mounted on said upright member, a carriage slidable on said base, means adapted to lock said carriage in position, spring supporting means, rotatable chuck means positioned on said carriage and being adapted to hold said spring supporting means in such manner that it can extend to said beam, locking means adjustable in nature so as to either permit or prevent rotation of said chuck means, means on both said beam and said chuck means adapted to engage the ends of any spring carried by said spring supporting means, rotation of said chuck means causing a force to be transmitted through said spring to said beam when said spring ends are engaged by said means on both said beam and chuck means, and means for indicating the number of degrees said chuck means is rotated, said balance means adapted to measure said force transmitted to said beam.

5. Spring testing apparatus comprising a base, balance means disposed on said base, said balance means including a vertical member and a balanced beam pivotally carried by said vertical member, a carriage slidable on said base, a crankshaft disposed on said carriage, spring supporting means, rotatable chuck means mounted on one end of said crankshaft, said chuck means adapted to support in horizontal fashion said spring supporting means so that it can extend to said beam, means on said beam and on said chuck means adapted to engage the ends of a spring positioned for testing purposes on said spring supporting means, rotation of said chuck means adapted to cause a force to be transmitted through said spring to said beam when said spring ends are engaged by said means on said beam and on said chuck means.

6. Spring testing apparatus comprising a base, balance means disposed on said base, said balance means including a vertical member and a balanced beam pivotally carried by said vertical member, a carriage slidable on said base, a crankshaft disposed on said carriage, spring supporting means, rotatable chuck means mounted on one end of said crankshaft, said chuck means adapted to support in horizontal fashion said spring supporting means so that it can extend to said beam, means on said beam and on said chuck means adapted to engage the ends of a spring positioned for testing purposes on said spring supporting means, rotation of said chuck means adapted to cause a force to be transmitted through said spring to said beam when said spring ends are engaged by said means on said beam and on said chuck means, and means for indicating the number of degrees said chuck means is rotated and for measuring the amount of force transmitted to said beam.

7. Spring testing apparatus comprising a base, balance means located at one end of said base and comprising an upright member and a balanced beam pivotally mounted on said upright member, a carriage slidable on said base, an arbor, rotatable chuck means positioned on said carriage and being adapted to hold said arbor in such manner that the arbor can extend to said beam, a chuck bar fixedly attached to said chuck means and adapted to rotate therewith, said arbor adapted to be loosely embraced by a spring to be tested, pins on both said beam and said chuck bar adapted to engage the ends of any spring carried by said arbor, rotation of said chuck means causing a force to be transmitted through said spring to said beam when said spring ends are engaged by said pins, and means for indicating the number of degrees said chuck means is rotated, said balance means adapted to measure said transmitted force.

8. Spring testing apparatus comprising a base, balance means disposed on said base, said balance means including a vertical member and a balanced beam pivotally carried by said vertical member, weighing pans supported from either end of said beam, a carriage slidable on said base, a crankshaft horizontally disposed on said carriage, spring supporting means, rotatable chuck means mounted on one end of said crankshaft and means for turning said crankshaft mounted on the opposite end thereof, said chuck means adapted to support in horizontal fashion said spring supporting means, pins on said beam and on said chuck means adapted to engage the ends of a spring positioned for testing purposes on said spring supporting means, rotation of said chuck means adapted to cause a force to be transmitted through said spring to said beam when said spring ends are engaged by said pins, and locking means adjustable in nature so as to either permit or prevent rotation of said crankshaft, said balance means adapted to measure said transmitted force.

9. Apparatus of the class described comprising, in combination, a base, balance means located at one end of said base and including a vertical stand member and a balanced beam pivotally mounted on said vertical member, both said stand member and said balanced beam having aligned bore portions, said balanced beam having weighing pans supported at either end thereof, a carriage assembly on said base, said carriage assembly including a base plate slidable on said base, a pair of upright members positioned on said base plate transversely thereof, a chankshaft horizontally carried by said pair of upright members, means for turning said crankshaft and means located on one of said pair of upright members for measuring the number of degrees said crankshaft is rotated, an arbor, rotatable chuck means disposed at one end of said crankshaft, said chuck means adapted to grasp said arbor in such fashion that said arbor can extend to and through said bore portions in said beam and said vertical stand member, pin means located on said beam and on said rotatable chuck means and adapted to engage a spring carried for testing purposes by said arbor, rotation of said rotatable chuck means causing a force to be transmitted through said spring to said beam when said pin means engage the ends of said spring, said balance means adapted to measure the transmitted force.

10. Apparatus in accord with claim 9 further having means for holding said beam stationary, locking means adjustable in nature so as to either permit or prevent rotation of said crankshaft, and means for holding said carriage assembly in position with respect to said base.

11. Apparatus of the class described comprising, in combination, a base, balance means located at one end of said base and including a vertical stand member and a balanced beam pivotally mounted on said vertical stand member, said balanced beam arm having a centrally located bore, said balanced beam having weighing pans supported at either end thereof, said balance means having located thereon means to indicate when said beam is horizontal, a carriage assembly on said base, said carriage assembly including a base plate slidable on said base, a pair of upright members positioned on said base plate transversely thereof, a crankshaft horizontally carried by said pair of upright members, locking means adjustable in nature so as to either permit or prevent rotation of said crankshaft, means for rotating said crankshaft, means located on one of said pair of upright members for measuring the number of degrees said crankshaft is rotated, means for locking said carriage assembly in position with respect to said base, spring supporting means, and rotatable chuck means disposed at one end of said crankshaft, said chuck means adapted to grasp said spring supporting means in such fashion that said spring supporting means can extend to and through said bore in said balanced beam, pin means located on both said beam and said rotatable chuck means and adapted to engage a spring carried for testing purposes by said spring supporting means, rotation of said rotatable chuck means causing a force to be transmitted through said spring to said beam when said pin means engage the ends of said spring, said balance means adapted to measure the transmitted force.

References Cited in the file of this patent

UNITED STATES PATENTS

| 155,051 | Thurston | Sept. 15, 1874 |
| 1,007,171 | Alford | Oct. 31, 1911 |
| 2,035,029 | Thomas | Mar. 24, 1936 |
| 2,342,919 | Chapman | Feb. 29, 1944 |
| 2,420,385 | Slusher | May 13, 1947 |

FOREIGN PATENTS

| 314,925 | Germany | Oct. 18, 1919 |
| 52,655 | Netherlands | June 15, 1942 |